(12) United States Patent
Gupta et al.

(10) Patent No.: US 12,133,092 B2
(45) Date of Patent: Oct. 29, 2024

(54) AUTOMATICALLY OPTIMIZING CELL PARAMETER OF SERVING BASE STATION

(71) Applicant: JIO PLATFORMS LIMITED, Mumbai (IN)

(72) Inventors: Deepak Gupta, Mumbai (IN); Gaurav Dalwadi, Mumbai (IN); Brijesh I Shah, Mumbai (IN); Nekiram Khosya, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 83 days.

(21) Appl. No.: 16/968,496

(22) PCT Filed: May 13, 2019

(86) PCT No.: PCT/IB2019/053910
§ 371 (c)(1),
(2) Date: Aug. 7, 2020

(87) PCT Pub. No.: WO2019/224649
PCT Pub. Date: Nov. 28, 2019

(65) Prior Publication Data
US 2020/0413271 A1     Dec. 31, 2020

(30) Foreign Application Priority Data
May 21, 2018 (IN) .............................. 201821019025

(51) Int. Cl.
*H04L 12/00* (2006.01)
*H04W 16/18* (2009.01)
(Continued)

(52) U.S. Cl.
CPC ........... *H04W 24/02* (2013.01); *H04W 16/18* (2013.01); *H04W 24/10* (2013.01); *H04W 36/0083* (2013.01)

(58) Field of Classification Search
None
See application file for complete search history.

(56) References Cited

U.S. PATENT DOCUMENTS

| | | | | |
|---|---|---|---|---|
| 2013/0115950 A1* | 5/2013 | Kawasaki | ....... | H04W 36/00835 455/436 |
| 2014/0036656 A1* | 2/2014 | Chou | .................... | H04W 40/20 370/216 |

(Continued)

FOREIGN PATENT DOCUMENTS

| | | |
|---|---|---|
| EP | 3209052 | 8/2017 |
| WO | WO 2018065865 | 3/2014 |
| WO | WO 2018065864 | 4/2018 |

OTHER PUBLICATIONS

International Search Report of counterpart PCT/IB2019/053910, dated Aug. 16, 2019, 3 pages.
(Continued)

*Primary Examiner* — Noel R Beharry
*Assistant Examiner* — Lionel Preval
(74) *Attorney, Agent, or Firm* — Klarquist Sparkman, LLP

(57) ABSTRACT

The present disclosure relates to automatically optimizing cell parameter(s) of serving base station(s) to effectively serve a coverage hole. In an embodiment, the system receives parameters such as at least one first parameter, at least one second parameter, at least one network performance parameter and the at least one cell parameter of the at least one serving base station. Further, based on the at least one network performance parameter, at least one coverage hole is identified from a coverage area (containing a plurality of sectors), wherein the coverage area is served by the at least one serving base station. Thereafter, a first optimization of the at least one cell parameter is performed and subsequently a first value of the at least one second (Continued)

parameter is determined. Further, a second optimization is performed if the first optimization is un-successful.

14 Claims, 4 Drawing Sheets

(51) Int. Cl.
*H04W 24/02* (2009.01)
*H04W 24/10* (2009.01)
*H04W 36/00* (2009.01)

(56) References Cited

U.S. PATENT DOCUMENTS

| | | | |
|---|---|---|---|
| 2014/0087739 A1 | 3/2014 | Weaver | |
| 2014/0113638 A1* | 4/2014 | Zhang | H04W 24/02 455/446 |
| 2014/0323119 A1* | 10/2014 | Bader | H04W 24/02 455/560 |
| 2016/0165462 A1* | 6/2016 | Tan | H04W 16/10 370/254 |
| 2016/0165469 A1* | 6/2016 | Gopalakrishnan | H04W 16/28 455/67.11 |
| 2016/0302089 A1* | 10/2016 | Schmidt | H04W 24/10 |
| 2019/0215700 A1* | 7/2019 | Sofuoglu | H04W 16/26 |
| 2019/0239086 A1* | 8/2019 | Shekalim | H04W 24/02 |

OTHER PUBLICATIONS

Written Opinion of counterpart PCT/IB2019/053910, dated Aug. 16, 2019, 5 pages.

\* cited by examiner

AUTOMATICALLY OPTIMIZING CELL PARAMETER OF SERVING BASE STATION

CROSS-REFERENCE TO RELATED APPLICATIONS

This is the U.S. National Stage of International Application No. PCT/IB2019/053910, filed May 13, 2019, which was published in English under PCT Article 21(2), which in turn claims the benefit of India Application No. 201821019025, filed in India on May 21, 2018, all of which are hereby incorporated by reference herein.

TECHNICAL FIELD

Embodiments of the present disclosure generally relate to wireless cellular networks. More particularly, the embodiments of the present disclosure relate to a system and a method for automatically optimizing cell parameter's of serving base station's for serving (effectively) a coverage hole/s.

BACKGROUND

With the advancements in wireless communications (such as GMS, EDGE, HSPA, LTE, etc.), wireless networks having multiple access points are extensively deployed to support communications for multiple users by sharing the available network resources and simultaneously provide communication services such as voice, video, data, advertisement, content, messaging, broadcasts, etc. One such network is Evolved Universal Terrestrial Radio Access (E-UTRA) which is a radio access network considered as a replacement of UMTS and HSDPA/HSUPA technologies specified in 3GPP releases 5 and beyond. E-UTRA is an air interface of 3GPP's Long Term Evolution (LTE) upgrade path for mobile networks. Also, LTE's E-UTRA is an entirely new air interface system and provides higher data rates, lower latency and is optimized for packet data, unlike HSPA. Similarly, the UMTS (successor to Global System for Mobile Communications (GSM)) not only supports various air interface standards such as W-CDMA, TD-CDMA and TD-SCDMA, but also supports enhanced 3G data communications protocols such as High Speed Packet Access (HSPA) that provides higher data transfer speeds and capacity to associated UMTS networks.

However, while providing the higher data transfer speeds and capacity, there are various problems associated with optimization of the cells. Therefore, 4G cellular deployment comprises various macro cells along with other small cells configured to provide coverage and capacity solution across the target area. As a result of which, the inter-site distance becomes narrower for the LTE network particularly with band 40 than 2G/3G radio access network (also suggested by "Martin Sauter, "From GSM to LTE—An Introduction to Mobile Networks and Mobile Broadband", 1st ed. UK: 5 John Wiley & Sons, 2011"). Also, a more number of sites/eNodeBs are required to mitigate on-going data demand in LTE network which results in a hyper dense radio access network in big cities (also suggested by "Johnson I Agbinya, Mari Carmen Aguayo-Torres, Ryszard Klempous and Jan Nikodem, "4G Wireless Communication Networks: Design, planning and application", River publisher, 10 2013").

According to 3GPP specification, a poor coverage area/ coverage hole in a wireless network may be defined as an area with poor RF coverage and RF quality where (i) pilot signal strength is below the threshold required by a user device (UE) to maintain an access to the network, or (ii) SINRs of both serving and neighbour cells is below a level needed to maintain a basic service. The coverage holes may be caused by physical obstructions (such as new buildings and hills), unsuitable antenna parameters, or inadequate radio frequency (RF) planning. In particular, a serving cell/base station is unable to provide adequate coverage to the UE in the coverage hole. Therefore, in the coverage hole, the signal strength of a cellular network experienced by the UE is insufficient to maintain the connectivity and also, there is no coverage from an alternative 3GPP LTE cell. Consequently, the UEs are not able to make network entry or hand overs and therefore, may suffer from call drops and Radio Link Failures (RLF).

Further, in a dense LTE network with closely spaced macro eNodeBs, more than one server is present in almost all the areas to meet capacity augmentation requirements/demands; but said more than one server causes interference and consequently degrades the overall quality of the network. Moreover, as the number of simultaneously served terminals in an area increases, channel becomes noisy which also degrades the overall channel quality. Thus, a poor RF quality degrades the network performance and deteriorates user experience.

Accordingly, there exists several known optimization techniques for optimising the network and enhancing the network performance. In one such optimization techniques, drive test measurements are performed, wherein the measurement samples are plotted on a geographical post-processing tool to identify poor RSRP and poor SINR areas. The cells serving in that area are also plotted to identify the servers in the identified poor areas, wherein the cells resulting into poor quality in the desired area are then considered for optimization followed by physical changes based on the operator defined process. Thus, the network is optimised based on the drive test measurements only. Also, the dependency of the service operators on drive test measurements makes said existing optimization technique costly as well as time consuming. Thus, said drive test based optimization technique cannot be made a continuous process because of the unavailability of daily drive test data in some scenarios. Another limitation of said optimization technique is that the drive tests are limited to only outdoor data of the network and not the indoor data where around seventy percent of data traffic is generated due to obstructions such as buildings. Therefore, said optimization technique fail to consider the indoor data that is critical for a seamless user experience. Yet another limitation of the said optimization technique lies in manually changing of tilt (electrical and mechanical) and RET feature multiple times in a quick span of time without any holistic reason.

Accordingly, in order to overcome the aforementioned problems inherent in the existing/outgoing solutions, there exists a need of an efficient mechanism for monitoring entire area (indoor and outdoor) of the cellular network and accordingly optimize the poor quality area instead of changing all parameters of overall network. Thus, there exists a need of an effective mechanism for automatically optimising at least one cell parameter of at least one serving base station for serving (effectively) at least one coverage hole having poor RF quality.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for automatically optimising at least one cell parameter of at least one serving base station for serving at least one coverage hole. The method comprising: receiving at least one first parameter, at least one second parameter, at least one network performance parameter and the at least one cell parameter of the at least one serving base station, wherein the at least one second parameter comprises at least one of a RF coverage power (RSRP) and a Signal-to-Interference Noise Ratio (SINR); identifying the at least one coverage hole from a coverage area served by the at least one serving base station, wherein the at least one coverage hole is identified based on the at least one network performance parameter of the coverage area, and the coverage hole is insufficiently served by the at least one serving base station; determining a current value of the at least one second parameter of the at least one serving base station, wherein the current value is determined for the at least one coverage hole; performing a first optimization of the at least one cell parameter of the at least one serving base station for serving the at least one coverage hole, wherein the first optimization is performed based on at least one of the current value and the at least one network performance parameter; determining a first value of the at least one second parameter of the at least one serving base station in an event the first optimization is performed; generating an optimization status of the first optimization based on a comparison of the first value and a target value of the at least one second parameter, wherein the status indicates one of a successful optimization and an un-successful optimization; and performing a second optimization of the at least one cell parameter of the at least one serving base station for serving the at least one coverage hole, wherein the second optimization is performed in an event the optimization status indicates the un-successful optimization.

Further, the embodiments of the present disclosure encompass a system for automatically optimising at least one cell parameter of at least one serving base station for serving at least one coverage hole. The system comprising: an input unit configured to receive at least one first parameter, at least one second parameter, at least one network performance parameter and at least one cell parameter of the at least one serving base station, wherein the at least one second parameter comprises at least one of a RF coverage power (RSRP) and a Signal-to-Interference Noise Ratio (SINR); and an optimizing unit configured to: identify the at least one coverage hole from a coverage area served by the at least one serving base station, wherein the at least one coverage hole is identified based on the at least one network performance parameter of the coverage area, and the coverage hole is insufficiently served by the at least one serving base station; determine a current value of the at least one second parameter of the at least one serving base station, wherein the current value is determined for the at least one coverage hole; perform a first optimization of the at least one cell parameter of the at least one serving base station for serving the at least one coverage hole, wherein the first optimization is performed based on at least one of the current value and the at least one network performance parameter; determine a first value of the at least one second parameter of the at least one serving base station in an event the first optimization is performed; generate an optimization status of the first optimization based on a comparison of the first value and a target value of the at least one second parameter, wherein the status indicates one of a successful optimization and an un-successful optimization; and perform a second optimization of the at least one cell parameter of the at least one serving base station for serving the at least one coverage hole, wherein the second optimization is performed in an event the optimization status indicates the un-successful optimization.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
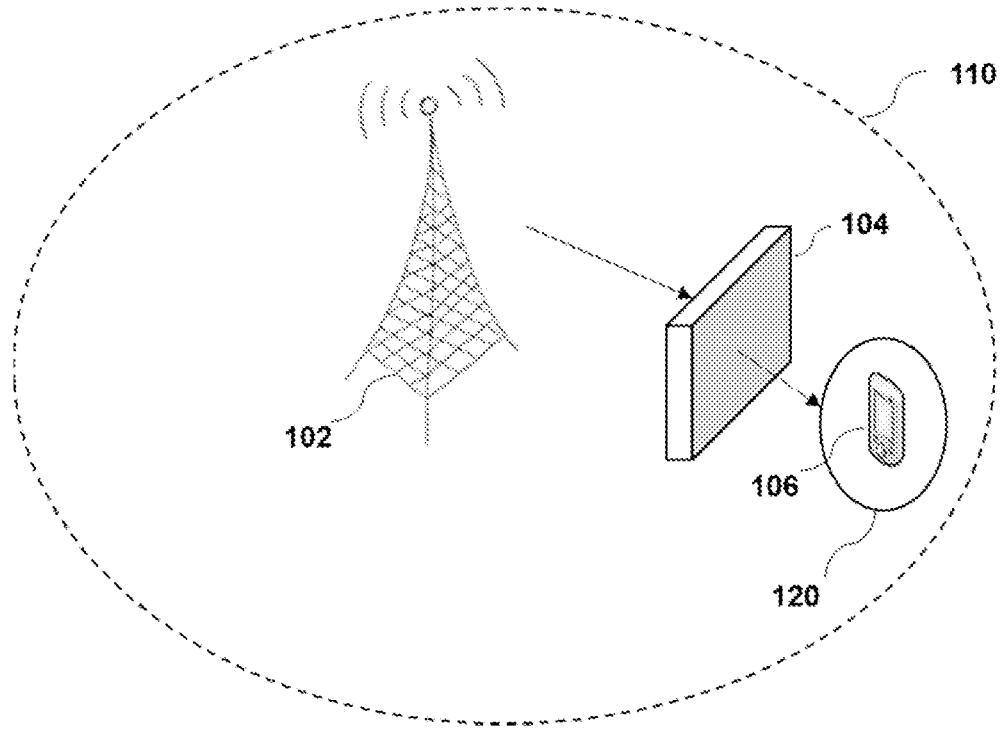
FIG. 1 illustrates an exemplary cellular network having at least one serving base station [102] serving a coverage area [110] in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and a method for automatically optimising at least one cell parameter of at least one serving base station, wherein the at least one serving base station serves a coverage area (containing a plurality of sectors). The system may receive a plurality of parameters such as at least one first parameter, at least one second parameter, at least one network performance parameter and at least one cell parameter of the at least one serving base station, wherein said plurality of parameters may be received from data source/s such as a LTE system manager (LSM) and a user device. Further, the system may identify at least one coverage hole from the coverage area based on the at least one network performance parameter of the coverage area. Pursuant to the identification of the at least one coverage hole for which optimization is required, the system may determine a current value of the at least one second parameter of the at least one serving base station and simultaneously define a target value of the least one second parameter based on the current value. Further, the system may perform a first optimization of the at least one cell parameter for serving the at least one coverage hole, wherein the first optimization is performed based on at least one of the current value and the at least one network performance parameter. Pursuant to said first optimization, the system may determine a first value (i.e. optimized value) of the at least one second parameter of the at least one serving base station, wherein the first value corresponds to the value of the at least one second parameter after accomplishment of said first optimization process. The system may then compare the first value with the target value and accordingly generate an optimization status of the first optimization, wherein the optimization status may indicate a successful optimization and an un-successful optimization. In an event the first value matches the target value, the status may indicate the successful optimization. Alternatively, the status may indicate the un-successful optimization in an event the first value does not match the target value, thereby resulting in a need of a second iteration of the optimization process i.e. second optimization. The second optimization process may be performed in a manner similar to the first optimization. In an embodiment, the process of optimizing the at least one cell parameter (for serving the at least one coverage hole) may be continued iteratively (at most twice) till the successful optimization is achieved.

The "at least one serving base station" as used herein may refer to one or more serving cells/base stations that provide a network coverage to a coverage area (geographic). In particular, the coverage area may be a permissible area where the at least one serving base station is designed to transmit the radio signals and provide cellular services. The coverage area may comprise a plurality of sectors (uplink and downlink). Also, in an embodiment, the coverage area may comprise one or more cells.

The "at least one coverage hole" as used herein may refer to a particular area/portion having the at least one network performance parameter insufficient for maintaining connectivity i.e. the at least one coverage hole is insufficiently served by the at least one serving base station. Also, the at least one coverage hole has an insufficient RF coverage and RF quality for maintaining access to network.

Thus, the at least one coverage hole may be referred as a target area/zone where the optimization is required. More particularly and as illustrated in FIG. 1, the at least one serving base station [102] may be configured to serve user device/s [106] present within the coverage of the at least one serving base station [102] i.e. the coverage area [110]. However, in few instances the coverage area [110] served by the at least one serving base station [102] may comprise at least one coverage hole (area) [120] where the at least one serving base station [102] may be unable to serve the user device [102] due to (i) direct physical obstructions such as buildings [104] in the hills or path of the at least one serving base station [102]; (ii) unsuitable antenna parameters and/or inadequate radio frequency (RF) planning; and (iii) large distance and/or terrain/collateral characteristics of the area lacking sufficient transmission power. Therefore, in the at least one coverage hole [120], the user device [106] may not be able to maintain the connectivity with the at least one serving base station [102] due to insufficient cellular network strength, and may consequently suffer from call drops and Radio Link Failures (RLF). Also, the at least one second parameter over the coverage area [110] may differ from the at least one second parameter over the at least one coverage hole [120]. The terms such as 'coverage hole', 'coverage area', 'RF coverage hole/area' and 'poor RF quality areas' have been used interchangeably throughout the disclosure.

The "user device [106]" as used herein may refer to any computing device including, but not limiting to, a smart phone, a feature phone, a tablet, a phablet and any such device obvious to a person skilled in the art. Further, the user device [106] may comprise an input means such as a keyboard, an operating system, a memory unit, a display interface, etc. Additionally, the user device [106] may be configured to communicate with the system and the LTE system manager (LSM) for sharing the at least one second parameter.

The "LTE system manager (LSM)" as used herein may refer to an interface with an operator/user having an ability to configure physical parameters of the network and act as a Self-Organizing Network (SON) server, wherein the physical parameters may include, but not limited to, antenna height, azimuth, site location, mechanical tilt and electrical tilt. Further, the LSM may be connected with each eNodeB present in the cellular area. Additionally, the LSM may be configured to communicate with the system and the user device [106] for sharing the at least one first parameter, the at least one cell parameter and the at least one network performance parameter. In an embodiment, the LSM may be configured to communicate with one or more cell sites to receive the at least one cell parameter. In another embodiment, the LSM may be updated with the at least one first parameter, the at least one second parameter, the at least one second parameter and the at least one cell parameter over a period of a time interval, wherein the time interval may be fixed or dynamic.

The "at the at least one first parameter" may comprise at least one of a drive test measurement data, a Reference Signal (RS) strength, a MCS, a call drop rate, a coverage of the at least one serving base station, a capacity of the at least one serving base station, a QOS of the at least one serving base station, an antenna height, an antenna width, an azimuth, an antenna beam width, a resource utilization of the at least one serving base station and a physical cell identity. Additionally, the at least one first parameter may comprise fault management related parameters and any such information as may be obvious to person skilled in the art.

The "at least one second parameter" may comprise at least one of a RF coverage power (RSRP), Signal-to-Interference Noise Ratio (SINR), a Reference Signal Received Quality (RSRQ), a Physical Cell ID (PCI) of the at least one serving base station and a geo-location of the at least one serving base station. Additionally, the at least one second parameter may comprise user device scheduling, resource utilization and any such information as may be obvious to person skilled in the art.

The "at least one network performance parameter" may comprise at least one of active users (also referred to as user density), a RRC connected users, a cell-effective DL throughput, a cell-effective UL throughput, a Channel Quality Indicator (CQI) and a PRB utilization percentage. Additionally, the following table (Table 1) illustrates key definitions of some of the at least one network performance parameters:

TABLE 1

| Network Performance Parameters | Key Definition |
| --- | --- |
| Total Traffic (GB) | PDCP packets(DL) + PDCP packet(UL) in GB |
| Effective DL Throughput (Mbps) | (MAC layer DL Packets in Bytes * 0.743 * 8)/Transmit time interval |
| User Perceived DL Throughput (Kbps) | IP throughput |
| DL PRB Utilization (%) | Total used DL PRB/Total DL PRB (%) |
| Average RRC Connected Users | RRC connection count |
| Average Active UE QCI 9-DL | Active UE count (DL) for QOS Class Identifier 9 i.e. TCP/IP based web browsing, buffered video services |
| Traffic Distribution (%) Band wise | Total traffic in band/Total average traffic in all bands |
| DL Average received CQI | Downlink Channel Quality Indicator |
| DL Average received RI | Downlink Rank Indicator |
| Mean DL scheduled MCS | Modulation and Coding Scheme |
| Session Setup Success Rate (%) | Session setup success count/Total session attempts |
| LTE Handover Success Rate (%) | Total Handover success count/Total Handover Attempts |
| RRC Drop Rate (%) | RRC connection failure count/Total RRC count (%) |
| VoLTE Call Drop Rate (%) | VoLTE Call drop count/Total VoLTE Call count (%) |
| VOMA_Mute Call Rate (%) | Mute Call count/Total Call count (%) |
| RRC Re-Establishment Success Rate (%) | RRC re-establishment success/Total RRS re-establishment attempts |

The "at least one cell parameter" may comprise at least one of an electrical tilt, a mechanical tilt, and a power attenuation. Further, the at least one antenna parameter may have at least one of a current value, a first value and a second value, wherein the current value may correspond to value of the at least one cell parameter before optimization while the first value and second value may correspond to value of the at least one cell parameter after optimization.

The "first optimization and the second optimization" as used herein may refer to a process of optimizing the at least one cell parameter (for serving the at least one coverage hole [120]) till the optimization status indicates the successful optimization i.e. till the first value matches the target value. Further, for each optimization process, the current value of the at least one second parameter is determined and the target value of said at least one second parameter is defined based on the current value of the at least one second parameter. Additionally, said optimization process may result in mitigating the at least one coverage hole [108] from the coverage area [110], thereby optimizing the cellular network and achieving an enhanced user experience.

Figure 2:
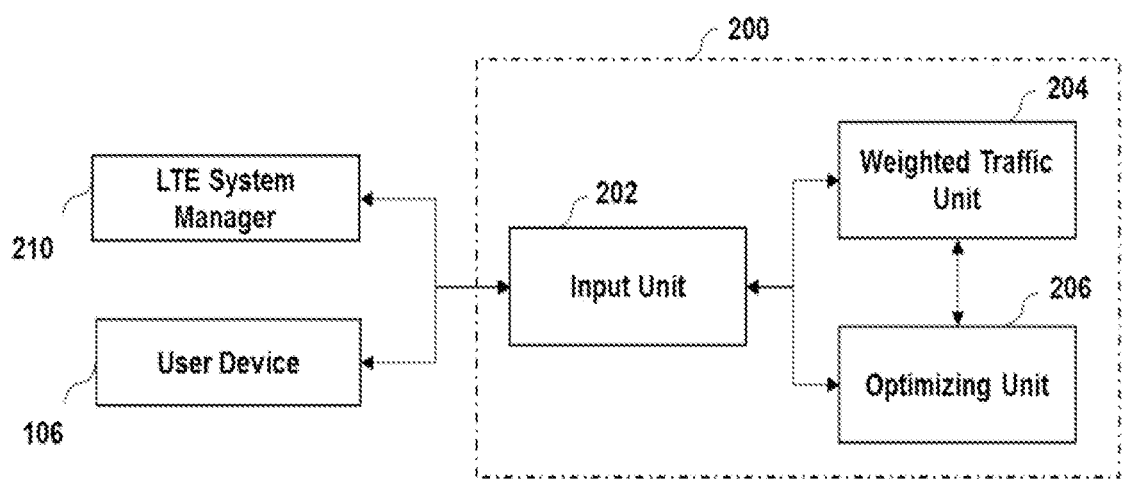
FIG. 2 illustrates a system architecture [200] for optimizing at least one cell parameter of at least one serving base station [102] in accordance with an embodiment of the present disclosure.

FIG. 2 illustrates a system architecture [200] for optimizing at least one cell parameter of at least one serving base station [102], thereby optimizing the coverage of the at least one coverage hole [120] served by at least one serving base station [102], in accordance with an embodiment of the present disclosure. As illustrated, the system [200] may comprise an input unit [202], a weighted traffic unit [204] and an optimizing unit [210], wherein the input unit [202] may be connected to data sources such as the LTE System Manager (LSM) [210] and the user device [106] for receiving a plurality of parameters/information. Furthermore, the input unit [202], the weighted traffic unit [204] and the optimizing unit [206], the data sources [210, 106] and sub-components therein may be configured to work in conjunction and provide respective functionalities in order to achieve the objective of the present disclosure. The system [200] may reside at the network end including, but not limiting to, at least one serving base station [102], a macro base station (for LTE terminology known as eNodeB), a micro base station and a small cell and an outdoor small cell.

The input unit [202] may be configured to receive at least one first parameter, at least one second parameter, at least one network performance parameter and at least one cell parameter of the at least one serving base station [102] from at least one of the LSM [210] and the user device [106]. The present invention encompasses receiving of said parameters through one of an automatic update and a manual update in the system [200]. Thereafter, the input unit [202] may be configured to transmit said parameters to the weighted traffic unit [204].

The weighted traffic unit [204] may be configured to analyse the at least one first parameter, the at least one second parameter and the at least one network performance parameter. In a preferred embodiment, the weighted traffic unit [204] may be configured to analyse the at least one network performance parameter for each of the plurality of sectors of the coverage area [110] and accordingly assign a weight to each of the plurality of sectors. In an exemplary scenario, the weight may be assigned to the plurality of sectors based on the user density such that the sectors having higher number of users may be assigned with higher weight as compared to the sectors having less number of users. In yet another exemplary scenario, the weight may be assigned to the plurality of sectors based on the RRC connected users, number of active users etc. The weighted traffic unit [204] may be configured to transmit said analysis (comprising the plurality of sectors (of the coverage area [110]) having the assigned weight along with the network performance parameter for each of the plurality of sectors) to the optimizing unit [206]. In an embodiment, the weighted traffic unit [204] may be configured to transmit said analysis to the optimizing unit [206] in form of a traffic report generated by the weighted traffic unit [204], wherein the traffic report may represent the plurality of sectors (having the assigned weight) along with the network performance parameter for each of the plurality of sectors. In an exemplary embodiment, the traffic report may be generated in one of a map and any such format as may be obvious to person skilled in the art, wherein the traffic reported is generated in map format using a user device trace data including, but not limiting to, user device latitude, user device longitude, reference signal received power, reference signal quality and physical cell identity.

Based on the analysis received from the weighted traffic unit [204], the optimizing unit [206] may be configured to identify the at least one coverage hole [120] from the coverage area [110] (containing plurality of sectors) i.e. the optimizing unit [206] may be configured to identify the at least one coverage hole [120] requiring the optimization from the plurality of sectors. In an embodiment, the optimizing unit [206] may identify the at least one coverage hole [120] using the following criteria:

Downlink Channel Quality Indicator (DL_CQI)<8; and
Radio Resource Control_Connected Users (RRC_Connected Users)>10

In an embodiment, the optimizing unit [206] may be configured to identify a best coverage portion/plot from the coverage area [110] based on said analysis of the network performance parameter.

Further, the optimizing unit [206] may now be configured to determine a current value of the at least one second parameter for the at least one coverage hole [120], wherein the current value may correspond to the value of the at least one second parameter before optimization. The at least one second parameter may include, but not limit, to the RF coverage power (RSRP) and the Signal-to-Interference Noise Ratio (SINR) over the at least one coverage hole [120], wherein the RSRP may indicate the coverage of the at least one coverage hole [120] and the SINR may indicate the overlapping/overshooting of the at least one coverage hole [120]. In an exemplary embodiment, the current value may correspond to an initial/current median value of the at least one second parameter i.e. median of the RSRP and the SINR. Additionally, the optimizing unit [206] may be configured to define a target value of the least one second parameter for the at least one coverage hole [120], wherein the target value may be defined based on the current value. For instance, the target value may be defined considering the current condition of the at least one coverage hole [120] indicating how much level of the optimization is required for the at least one coverage hole [120]. In an exemplary scenario, the target value may be defined as follows:

RSRP target value≥−95 dBm; and
SINR target value (current value+1)dB

Further, the optimizing unit [206] may be configured to perform a first optimization of the at least one cell parameter for serving the at least one coverage hole [120], wherein the first optimization is performed based on at least one of the current value of the at least one second parameter and the at least one network performance parameter. In particular, the optimizing unit [206] may be configured to optimize the value of at least one cell parameter (such as electrical tilt and transmit power attenuation) with an intention to make the value of the at least one second parameter comparable/close to the target value of the at least one second parameter. In an embodiment, the electrical tilt may be determined based on (i) distance of the at least one serving base station [102] from the at least one coverage hole [120], (ii) area of the at least one coverage hole [120] covered by the best coverage portion/plot, and (iii) height of the at least one serving base station [102]. The change in electrical tilt may be determined by using the following notation:

Change in Electrical Tilt=ArcTan{((Cell Height+
Mean Sea Level at Cell Position)−(Receiver
Height+Mean Sea Level At Receiver Position)/
(Distance of the cell from the coverage hole)}−
ArcTan{((Cell Height+Mean Sea Level at Cell
Position)−(Receiver Height+Mean Sea Level At
Receiver Position))/(Distance of the farthest
point of the cell best server plot lying within
the coverage hole)}.

Further, the optimizing unit [206] may be configured to determine a first value of the at least one second parameter, wherein the first value may correspond to the value of the at least one second parameter after accomplishment of the first optimization. The optimizing unit [206] may be then configured to compare the first value and the target value to check whether or not the first optimization is performed successfully. Accordingly, based on said comparison, the optimizing unit [206] may be configured to generate the optimization status of the first optimisation. In an event, the first value matches the target value, the optimization status indicates the successful optimization, thereby indicating that the at least one serving base station [102] may now sufficiently serve the at least one coverage hole [120] (i.e. the at least one coverage hole [108]). In the event the first value does not match the target value, the optimization status indicates the un-successful optimization, thereby resulting in the second optimization. While performing the second optimization, the optimizing unit [206] may be configured to optimize the at least one cell parameter (such as m-tilt and azimuth) based on at least one of the first value of the at least one second parameter, the at least one network performance parameter and the target value of the at least one second parameter. Pursuant to the accomplishment of the second optimization, the optimizing unit [206] may be configured to determine a second value of the at least one second parameter which may be further compared with the target value. Similarly, in an event, the second value matches the target value, the optimization status may indicate the successful optimization, while in the event if the second value does not match the target value, the optimization status may indicate the un-successful optimization. In an embodiment, the target value may be re-defined for the second optimization based on the first value and the earlier target value, wherein the first value may be now referred to as the current value for the second optimization.

The present invention further encompasses analysis of the key evaluation parameters to perform an action, wherein the action includes modifying/changing the optimization of the at least one cell parameter of the at least one serving base station [102] in the first optimization and the second optimization i.e. said action may include optimizing the at least one cell parameter again. Said key evaluation parameters may be broadly selected from the at least one first cell parameter and the at least one second parameter. The following exemplary table illustrates effect of the key evaluation parameters on the optimization, wherein the key evaluation parameters may be selected as RSRP, SINR, MCS, call drop rate, handover success rate, number of handovers, RRC re-establishments, Performance Management (PM), Configuration Management [CM], Operating Support System (OSS):

TABLE 2

| Effect on key evaluation parameters | Coverage Hole Area | Further action to be performed |
|---|---|---|
| Key Performance Indicators improving | No coverage hole | Ideal Condition - Process Complete |
| Key Performance Indicators improving | coverage hole area shrink | Continue to uptilt by one unit more |
| Key Performance Indicators improving | No change in coverage area | Continue to uptilt by one unit more |
| Key Performance Indicators improving | coverage hole area increased | Revert back to original configuration |
| Key Performance Indicators deteriorating | No coverage hole | Reduce the tilt angle by 50% of previous change. If no tilt applied, reduce RS boosting from twice to 1.5 times of the PDSCH EPREs |
| Key Performance Indicators deteriorating | coverage hole area shrink | Reduce the tilt angle by 50% of previous change. If no tilt applied, reduce RS boosting from twice to 1.5 times of the PDSCH EPREs. |
| Key Performance Indicators deteriorating | No change in coverage area | Revert back to original configuration |
| Key Performance Indicators deteriorating | coverage hole area increased | Revert back to original configuration |

As illustrated in above table (Table 2), different actions may be performed based on the variation in key evaluation parameters and the at least one coverage hole [120]. For instance, an ideal condition may correspond to an event where the key evaluation parameters are improving with no coverage holes that indicates 'no action pending' due to zero coverage hole. In another exemplary scenario where there is deterioration in the key evaluation parameters as well as in the at least one coverage hole [120], said action may include reducing the at least one cell parameter (electrical tilt angle) by 50 percent of the previous change in electrical tilt; however, if the previous change in electrical tilt is minimal, then RS power/transmission power may be reduced from twice to 1.5 times of the PDSCH EPREs.

Further, in an embodiment, the optimizing unit [206] may be configured to monitor the at least one first parameter, the at least one second parameter, the at least on network performance parameter and the at least one cell parameter for obtaining better optimization results.

In an exemplary scenario of a cluster of 7 km² area having 23 sites, the sites may operate in three bands: (i) 2300 MHz with 10 MHz/20 MHz channel bandwidth; (ii) 1800 MHz with 5 MHz channel bandwidth; and (iii) 850 MHz with 5 MHz channel bandwidth. Herein, the optimizing unit [206] may be configured to compare the current value and the first value of the following parameters to check whether or not the first optimization is successful.

ii. Cell effective throughput and User perceived downlink (DL) throughput are improved by 4.8% and 8.3% respectively;
iii. Average received CQI, RI and MCS are improved by 5.1%, 2.5% and 4.2% respectively; and
iv. VoLTE call drop rate is improved slightly.

Figure 3A:
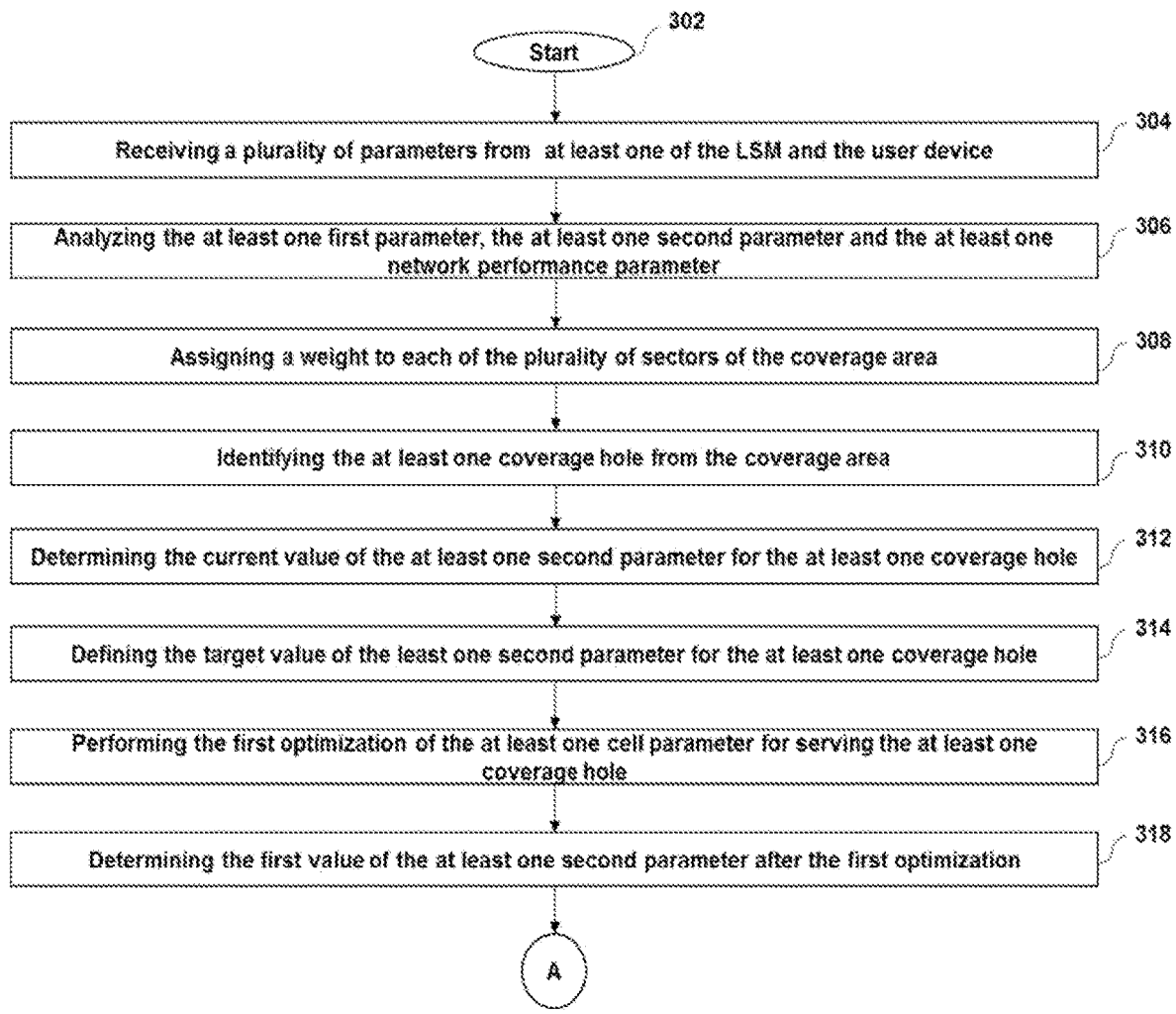
FIG. 3 (FIG. 3A and FIG. 3B) illustrates an exemplary method flow diagram [300] comprising the method for optimizing at least one cell parameter of at least one serving base station [102] in accordance with an embodiment of the present disclosure.
Figure 3B:
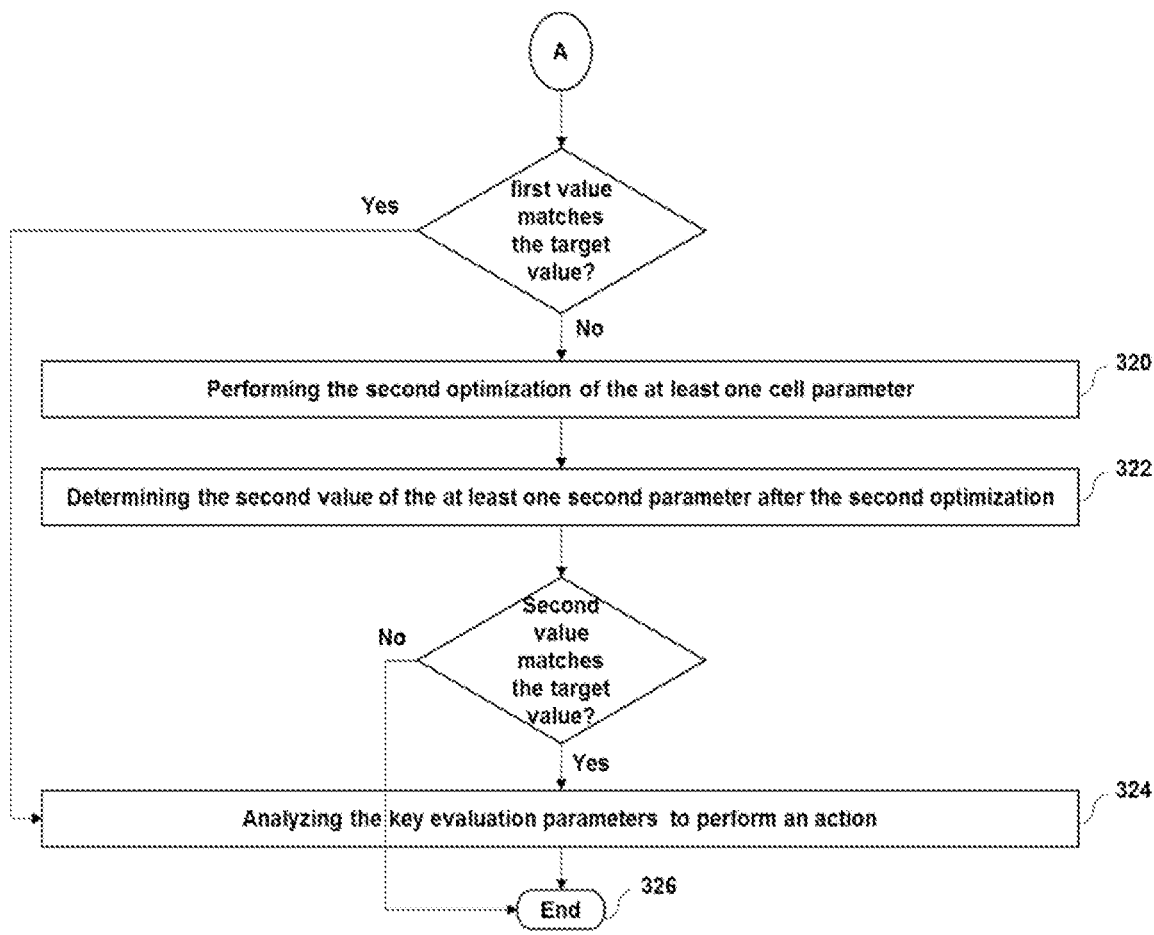

FIG. 3 (FIG. 3A and FIG. 3B) illustrates an exemplary method flow diagram [300] comprising the method for optimizing at least one cell parameter of at least one serving base station [102], thereby optimizing the coverage of the at least one coverage hole [120] inefficiently served by at least one serving base station [102], in accordance with an embodiment of the present disclosure. The method [300] may initiate at step 302 where the at least one serving base station [102] may not be properly serving any portion of the coverage area [110] i.e. the coverage hole [120], wherein the coverage area [110] may comprise the plurality of sectors.

At step 304, the input unit [202] may receive at least one first parameter, at least one second parameter, at least one network performance parameter and at least one cell parameter of the at least one serving base station [102] from at least one of the LSM [210] and the user device [106]. Said

TABLE 3

| | | PRE OPTIMIZATION (CURRENT VALUE) | | | | | POST OPTIMIZATION (FIRST VALUE) | | | | | |
|---|---|---|---|---|---|---|---|---|---|---|---|---|
| Network Performance Parameters | | 2300 Mz C1 | 2300 Mz C2 | 1800 Mz | 850 MHz | Weighted Avg/Sum | 2300 Mz C1 | 2300 Hz C2 | 800 MHz | 850 MHz | Weighted Avg/Sum | Remarks |
| CAPACITY | Total Traffic(Gb) | 925 | 382 | 130 | 374 | 1811 | 1009 | 379 | 121 | 365 | 1893 | 82 GB Traffic Increased |
| | Cell Effective dl Throughput (mbps) | 12.43 | 8.27 | 4.05 | 4.24 | 29.0 | 13.60 | 8.41 | 4.20 | 4.20 | 30.4 | Improved (4.8%) |
| | User perceived DI Throughput (Kbps) | 1580 | 2354 | 788 | 689 | 1502 | 1655 | 2666 | 815 | 689 | 1627 | Improved (8.3%) |
| | DL PRB Utilization (%) | 74.22 | 57.97 | 73.58 | 77.53 | 70.80 | 73.91 | 58.94 | 64.91 | 75.86 | 68.40 | PRB Utilization Reduced (3.3%) |
| | Average RRC Connected Users | 49.65 | 26.55 | 27.17 | 33.05 | 136.40 | 53.02 | 26.45 | 25.20 | 35.19 | 139.80 | Increased |
| | Average Active UE QCI 9-DL | 9.80 | 4.01 | 5.37 | 6.47 | 25.60 | 10.07 | 3.86 | 4.82 | 6.40 | 25.10 | Slightly Reduced |
| | Traffic Distribution (%)Band Wish | 21.1% | 21.1% | 7.2% | 20.7% | 100.0% | 53.3% | 21.0% | 6.4% | 19.3% | 100.0% | No change |
| Quality | DL Average Received CQI | 7.45 | 8.79 | 8.07 | 7.79 | 7.80 | 7.92 | 8.94 | 8.57 | 7.95 | 8.20 | Improved (5.1%) |
| | DL Average Received RI | 1.140 | 1.26 | 1.16 | 1.16 | 1.17 | 1.171 | 1.28 | 1.21 | 1.17 | 1.20 | Improved (2.5%) |
| | Mean DL scheduled MCS | 10.23 | 12.95 | 9.82 | 10.07 | 10.74 | 11.08 | 13.05 | 10.10 | 9.81 | 11.19 | Improved (4.2%) |
| Major K pls | Session Setup Success rate (%) | 99.9 | 100.0 | 99.8 | 99.6 | 99.8 | 99.9 | 99.9 | 99.8 | 99.3 | 99.7 | No change |
| | LTE Handover Success rate (%) | 99.8 | 99.7 | 99.6 | 99.4 | 99.6 | 99.7 | 99.8 | 99.7 | 99.6 | 99.7 | No change |
| | RRC Drop Rate (%) | 0.21 | 0.17 | 0.29 | 0.41 | 0.270 | 0.24 | 0.21 | 0.30 | 0.43 | 0.290 | Slightly Reduced |
| | Volte call Drop rate (%) | 0.13 | 0.22 | 0.08 | 0.10 | 0.13 | 0.01 | 0.4 | 0.02 | 0.04 | 0.03 | Improved |
| | VOMA_Mute call Rate(%) | 1.12 | 0.89 | 1.59 | 2.01 | 1.40 | 0.90 | 1.30 | 1.53 | 2.14 | 1.50 | Slightly Reduced |
| | RRC Re-Establishment Success rate (%) | 83.4 | 83.7 | 86.8 | 82.7 | 84.1 | 79.4 | 80.0 | 85.0 | 82.9 | 81.8 | Slightly Reduced |

Based on the comparison (illustrated in above Table 3), it may be observed that:
i. Total traffic is increased by 82 GB among all bands for the at least one coverage hole [120];

parameters may be received through one of an automatic update and a manual update in the system [200]. Thereafter, said parameters may be transmitted to the weighted traffic unit [204].

At step 306, the weighted traffic unit [204] may analyse the at least one first parameter, the at least one second parameter and the at least one network performance parameter. In a preferred embodiment, the weighted traffic unit [204] may analyse the at least one network performance parameter for each of the plurality of sectors of the coverage area [110].

At steps 308, the weighted traffic unit [204] may assign a weight to each of the plurality of sectors based on the analysis of the at least one network performance parameter. In an exemplary scenario, the weight may be assigned to the plurality of sectors based on the user density while in another exemplary scenario, the weight may be assigned to the plurality of sectors based on the RRC connected users, number of active users etc. Thereafter, said analysis (comprising the plurality of sectors having the assigned weight along with the network performance parameter for each of the plurality of sectors) may be transmitted to the optimizing unit [206]. In an embodiment, the weighted traffic unit [204] may transmit said analysis in the form of a traffic report generated by the weighted traffic unit [204], wherein the traffic report may be generated in one of a map and any such format as may be obvious to person skilled in the art, wherein the traffic reported is generated in map format using a user device trace data including, but not limiting to, user device latitude, user device longitude, reference signal received power, reference signal quality and physical cell identity etc.

At step 310, the optimizing unit [206] may identify the at least one coverage hole [120] from the coverage area [110] (containing plurality of sectors) based on the analysis received from the weighted traffic unit [204] i.e. the optimizing unit [206] may identify the at least one coverage hole [120] requiring the optimization from the plurality of sectors contained in the coverage area [110]. In an embodiment, the optimizing unit [206] may identify the at least one coverage hole [120] using the following criteria:

Downlink Channel Quality Indicator (DL_CQI)<8; and
Radio Resource Control_Connected Users (RRC_Connected Users)>10

In an embodiment, the optimizing unit [206] may identify the best coverage portion/plot from the coverage area [110] based on said analysis of the network performance parameter.

At step 312, the optimizing unit [206] may now determine the current value of the at least one second parameter for the at least one coverage hole [120], wherein the current value may correspond to the value of the at least one second parameter before optimization. The at least one second parameter may include, but not limit, to the RF coverage power (RSRP) and the Signal-to-Interference Noise Ratio (SINR) over the at least one coverage hole [120]. In an exemplary embodiment, the current value may correspond to the initial/current median value of the at least one second parameter i.e. median of the RSRP and the SINR.

At step 314, the optimizing unit [206] may define the target value of the least one second parameter for the at least one coverage hole [120], wherein the target value may be defined based on the current value. For instance, the target value may be defined considering the current condition of the at least one coverage hole [120] indicating how much level of the optimization is required for the at least one coverage hole [120]. In an exemplary scenario, the target value may be defined as follows:

RSRP target value≥−95 dBm; and
SINR target value≥(current value+1) dB

At step 316, the optimizing unit [206] may perform the first optimization of the at least one cell parameter for serving the at least one coverage hole [120], wherein the first optimization is performed based on at least one of the current value of the at least one second parameter and the at least one network performance parameter. In an embodiment, the electrical tilt may be determined based on (i) distance of the at least one serving base station [120] from the at least one coverage hole [120], (ii) area of the at least one coverage hole [120] covered by the best portion/plot, and (iii) height of the at least one serving base station [102]; and the change in electrical tilt may be determined by using the following notation:

Change in Electrical Tilt=ArcTan{((Cell Height+
Mean Sea Level at Cell Position)−(Receiver
Height+Mean Sea Level At Receiver Position)/
(Distance of the cell from the coverage hole)}−
ArcTan{((Cell Height+Mean Sea Level at Cell
Position)−(Receiver Height+Mean Sea Level At
Receiver Position))/(Distance of the farthest
point of the cell best server plot lying within
the coverage hole)}.

At step 318, the optimizing unit [206] may determine the first value of the at least one second parameter, wherein the first value may correspond to the value of the at least one second parameter after accomplishment of the first optimization. The optimizing unit [206] may then compare the first value and the target value to check whether or not the first optimization is performed successfully. Accordingly, based on said comparison, the optimizing unit [206] may generate the optimization status of the first optimisation. In an event, the first value matches the target value, the optimization status indicates the successful optimization and the method [300] may lead to step [324]. On the contrary, if the first value does not match the target value, the optimization status indicates the un-successful optimization and the method [300] may lead to step [320].

At step 320, the optimizing unit [206] may perform the second optimization in an event the first value does not match the target value. While performing the second optimization, the optimizing unit [206] may optimize the at least one cell parameter (such as m-tilt and azimuth) based on at least one of the first value of the at least one second parameter, the at least one network performance parameter and the target value of the at least one second parameter.

At step 322, the optimizing unit [206] may determine the second value of the at least one second parameter which may be further compared with the target value. In an embodiment, the target value may be re-defined for the second optimization based on the first value and the earlier target value, wherein the first value may be now referred to as the current value for the second optimization. Accordingly, based on said comparison, the optimizing unit [206] may generate the optimization status of the second optimisation. In an event, the second value matches the target value, the optimization status indicates the successful optimization and the method [300] may lead to step [324]. On the contrary, if the second value does not match the target value, the optimization status indicates the un-successful optimization and the method [300] may terminate at step [326].

At step 324, the optimizing unit may analyse the key evaluation parameters (as listed in the Table 2) to perform the action, wherein the action includes modifying/changing the optimization of the at least one cell parameter of the at least one serving base station [102] in the first optimization and the second optimization i.e. said action may include optimizing the at least one cell parameter again. In an exemplary scenario where there is deterioration in the key evaluation parameters as well as in the at least one coverage hole [120], the action may include reducing the at least one cell parameter (electrical tilt angle) by 50 percent of the previous change in electrical tilt. Further, the method [300] may terminate at step 326 where the at least one serving base station [102] may now sufficiently serve the at least one coverage hole [120] pursuant to the successful accomplishment of at least one of the first optimization and the second optimization.

Therefore, the present disclosure encompasses a system and a method for automatically optimizing the at least one cell parameter of the at least one serving base station [102] for serving the at least one coverage hole [120] efficiently. The present disclosure also encompasses mitigating the at least one coverage hole [120], thereby enhancing overall user experience by providing seamless services without any latency and call drops in the at least one coverage hole [120]. Thus, the present disclosure encompasses evaluation of the plurality of parameters to perform the optimization of the at least one cell parameter.

Though a limited number of the user device [106], the input unit [202], the weighted traffic unit [204], the optimizing unit [206], the at least one serving base station [102] and the subcomponents therein have been shown in the figures; however, it will be appreciated by those skilled in the art that the system [200] of the present disclosure encompasses any number and varied types of the components/modules and other components/sub systems as may be obvious to person skilled in the art.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method [300] for automatically optimising at least one cell parameter of at least one serving base station [102] for serving at least one coverage hole [120], the method [300] comprising:
   receiving at least one first parameter, at least one second parameter, at least one network performance parameter, and the at least one cell parameter of the at least one serving base station [102], wherein the at least one serving base station [102] serves a coverage area [110] comprising a plurality of sectors, wherein the at least one second parameter comprises at least one of a RF coverage power (RSRP) and a Signal-to-Interference Noise Ratio (SINR);
   assigning a weight to each of the plurality of sectors of the coverage area [110], wherein the weight is assigned based on the at least one network performance parameter of each of the plurality of the sectors;
   identifying the at least one coverage hole [120] from the coverage area [110] served by the at least one serving base station [102], wherein:
      the at least one coverage hole [120] is identified based on the weight assigned to each of the plurality of sectors and the at least one network performance parameter of the coverage area [110], and
      the at least one coverage hole [120] is insufficiently served by the at least one serving base station [102];
   determining a current value of the at least one second parameter of the at least one serving base station [102], wherein the current value is determined for the at least one coverage hole [120];
   defining a target value of the at least one second parameter of the at least one serving base station [102] based on the current value of the at least one second parameter, wherein, based on the target value and the current value of the at least one second parameter, a level of optimization of the at least one cell parameter is determined;
   upon the determination of the level of optimization, performing a first optimization of the at least one cell parameter of the at least one serving base station [102] for serving the at least one coverage hole [120], wherein the first optimization is performed based on the current value and the at least one network performance parameter;
   determining a first value of the at least one second parameter of the at least one serving base station [102] in an event the first optimization is performed;
   generating an optimization status of the first optimization based on a comparison of the first value and the target value of the at least one second parameter, wherein the optimization status indicates one of a successful optimization and an un-successful optimization; and
   performing a second optimization of the at least one cell parameter of the at least one serving base station [102] for serving the at least one coverage hole [120], wherein the second optimization is performed in an event the optimization status indicates the un-successful optimization.

2. The method as claimed in claim 1, further comprising generating a traffic report, wherein:
   the traffic report represents the plurality of sectors having the assigned weight and the at least one network performance parameter of each of the plurality of the sectors, and the traffic report is generated in one of a map based on a user device trace data.

3. The method [300] as claimed in claim 1, further comprising monitoring the at least one first parameter, the at least one second parameter, the at least one network performance parameter and the at least one cell parameter.

4. The method [300] as claimed in claim 1, wherein the at least one first parameter, the at least one second parameter, the at least one network performance parameter and the at least one cell parameter are received from at least one of a LTE system manager [210] and a user device [106].

5. The method [300] as claimed in claim 1, wherein the at least one first parameter comprises at least one of a drive test measurement data, a Reference Signal (RS) strength, a MCS, a call drop rate, a coverage of the at least one serving base station [102], a capacity of the at least one serving base station [102], a QOS of the at least one serving base station [102], an antenna height, an antenna width, an azimuth, an antenna beam width, a resource utilization of the at least one serving base station [102] and a physical cell identity.

6. The method [300] as claimed in claim 1, wherein the at least one second parameter further comprises at least one of a Reference Signal Received Quality (RSRQ), a Physical Cell ID (PCI) of the at least one serving base station [102], a geo-location of the at least one serving base station [102], a latitude and a longitude.

7. The method [300] as claimed in claim 1, wherein the at least one cell parameter comprises at least one of an electrical tilt, a mechanical tilt and a power attenuation.

8. The method [300] as claimed in claim 1, wherein the at least one network performance parameter comprises at least one of a number of active users, a RRC connected users, a cell-effective DL throughput, a cell-effective UL throughput, a Channel Quality Indicator (CQI) and a PRB utilization percentage.

9. The method [300] as claimed in claim 1, wherein the current value of the at least one second parameter corresponds to a value of the at least one second parameter before the optimization.

10. The method [300] as claimed in claim 1, wherein the first value and a second value correspond to a value of the at least one second parameter after optimization.

11. A system [200] for automatically optimising at least one cell parameter of at least one serving base station [102] for serving at least one coverage hole [120], the system [200] comprising:
  an input unit [202] configured to receive at least one first parameter, at least one second parameter, at least one network performance parameter, and at least one cell parameter of the at least one serving base station [102], wherein the at least one serving base station [102] serves a coverage area [110] comprising a plurality of sectors, wherein the at least one second parameter comprises at least one of a RF coverage power (RSRP) and a Signal-to-Interference Noise Ratio (SINR);
  a weighted traffic unit [204] configured to assign a weight to each of the plurality of sectors of the coverage area [110], wherein the weight is assigned based on the at least one network performance parameter of each of the plurality of the sectors; and
  an optimizing unit [206] configured to:
  identify the at least one coverage hole [120] from the coverage area [110] served by the at least one serving base station [102], wherein:
    the at least one coverage hole [120] is identified based on the weight assigned to each of the plurality of sectors and the at least one network performance parameter of the coverage area [110], and
    the at least one coverage hole [120] is insufficiently served by the at least one serving base station [102];
  determine a current value of the at least one second parameter of the at least one serving base station [102], wherein the current value is determined for the at least one coverage hole [120];
  define a target value of the at least one second parameter of the at least one serving base station [102] based on the current value of the at least one second parameter, wherein, based on the target value and the current value of the at least one second parameter, a level of optimization of the at least one cell parameter is determined;
  upon the determination of the level of optimization, perform a first optimization of the at least one cell parameter of the at least one serving base station [102] for serving the at least one coverage hole [120], wherein the first optimization is performed based on the current value and the at least one network performance parameter;
  determine a first value of the at least one second parameter of the at least one serving base station [102] in an event the first optimization is performed;
  generate an optimization status of the first optimization based on a comparison of the first value and the target value of the at least one second parameter, wherein the optimization status indicates one of a successful optimization and an un-successful optimization; and
  perform a second optimization of the at least one cell parameter of the at least one serving base station [102] for serving the at least one coverage hole [120], wherein the second optimization is performed in an event the optimization status indicates the un-successful optimization.

12. The system [200] as claimed in claim 11, wherein the weighted traffic unit [204] is further configured to:
  generate a traffic report, wherein:
    the traffic report represents the plurality of sectors having the assigned weight and the at least one network performance parameter of each of the plurality of the sectors, and
    the traffic report is generated in one of a map based on a user device trace data.

13. The system [200] as claimed in claim 11, wherein the optimizing unit [206] is further configured to monitor the at least one first parameter, the at least one second parameter, the at least one network performance parameter and the at least one cell parameter.

14. One or more non-transitory computer-readable media comprising computer-executable instructions that, when executed by a computing system, cause the computing system to perform a method of automatically optimizing at least one cell parameter of at least one serving base station for serving at least one coverage hole, the method comprising:
  receiving at least one first parameter, at least one second parameter, at least one network performance parameter, and the at least one cell parameter of the at least one serving base station, wherein the at least one serving base station serves a coverage area comprising a plurality of sectors, wherein the at least one second parameter comprises at least one of a RF coverage power (RSRP) and a Signal-to-Interference Noise Ratio (SINR);
  assigning a weight to each of the plurality of sectors of the coverage area [110], wherein the weight is assigned based on the at least one network performance parameter of each of the plurality of the sectors;
  identifying the at least one coverage hole from the coverage area served by the at least one serving base station, wherein the at least one coverage hole is identified based on the weight assigned to each of the plurality of sectors and the at least one network performance parameter of the coverage area, and the at least one coverage hole is insufficiently served by the at least one serving base station;
  determining a current value of the at least one second parameter of the at least one serving base station, wherein the current value is determined for the at least one coverage hole;
  defining a target value of the at least one second parameter of the at least one serving base station based on the current value of the at least one second parameter, wherein, based on the target value and the current value of the at least one second parameter, a level of optimization of the at least one cell parameter is determined;
  upon the determination of the level of optimization, performing a first optimization of the at least one cell parameter of the at least one serving base station for serving the at least one coverage hole, wherein the first optimization is performed based on the current value and the at least one network performance parameter;

determining a first value of the at least one second parameter of the at least one serving base station in an event the first optimization is performed;

generating an optimization status of the first optimization based on a comparison of the first value and the target value of the at least one second parameter, wherein the optimization status indicates one of a successful optimization and an un-successful optimization; and performing a second optimization of the at least one cell parameter of the at least one serving base station for serving the at least one coverage hole, wherein the second optimization is performed in an event the optimization status indicates the un-successful optimization.

* * * * *